Oct. 13, 1931.  T. BROWN  1,827,708
CULTIVATOR
Filed Oct. 1, 1930  2 Sheets-Sheet 2
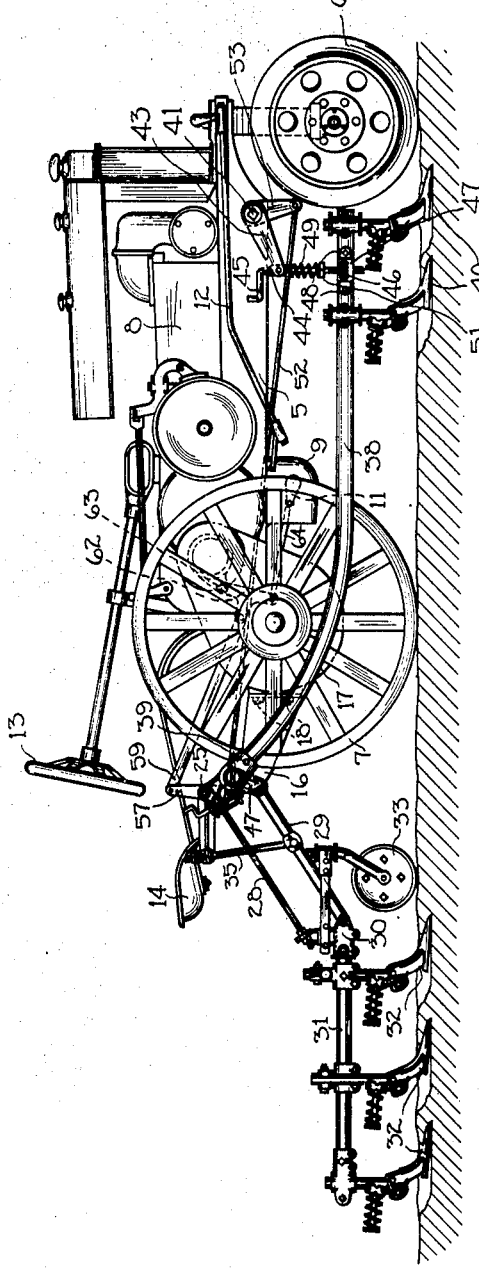
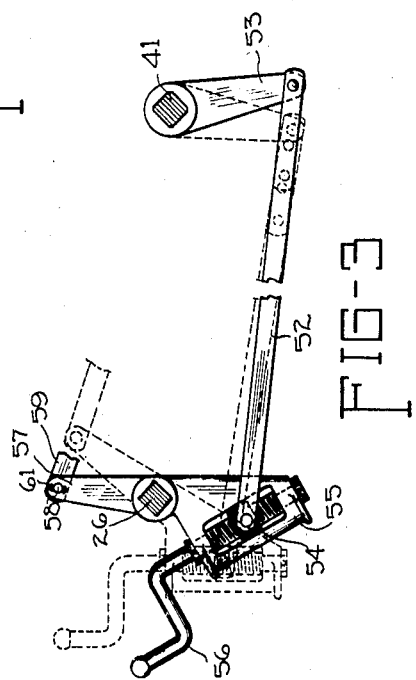
WITNESS
Walter Ackerman
INVENTOR
Theophilus Brown
BY Brown, Jackson, Boettcher & Kinney
ATTORNEY Patented Oct. 13, 1931

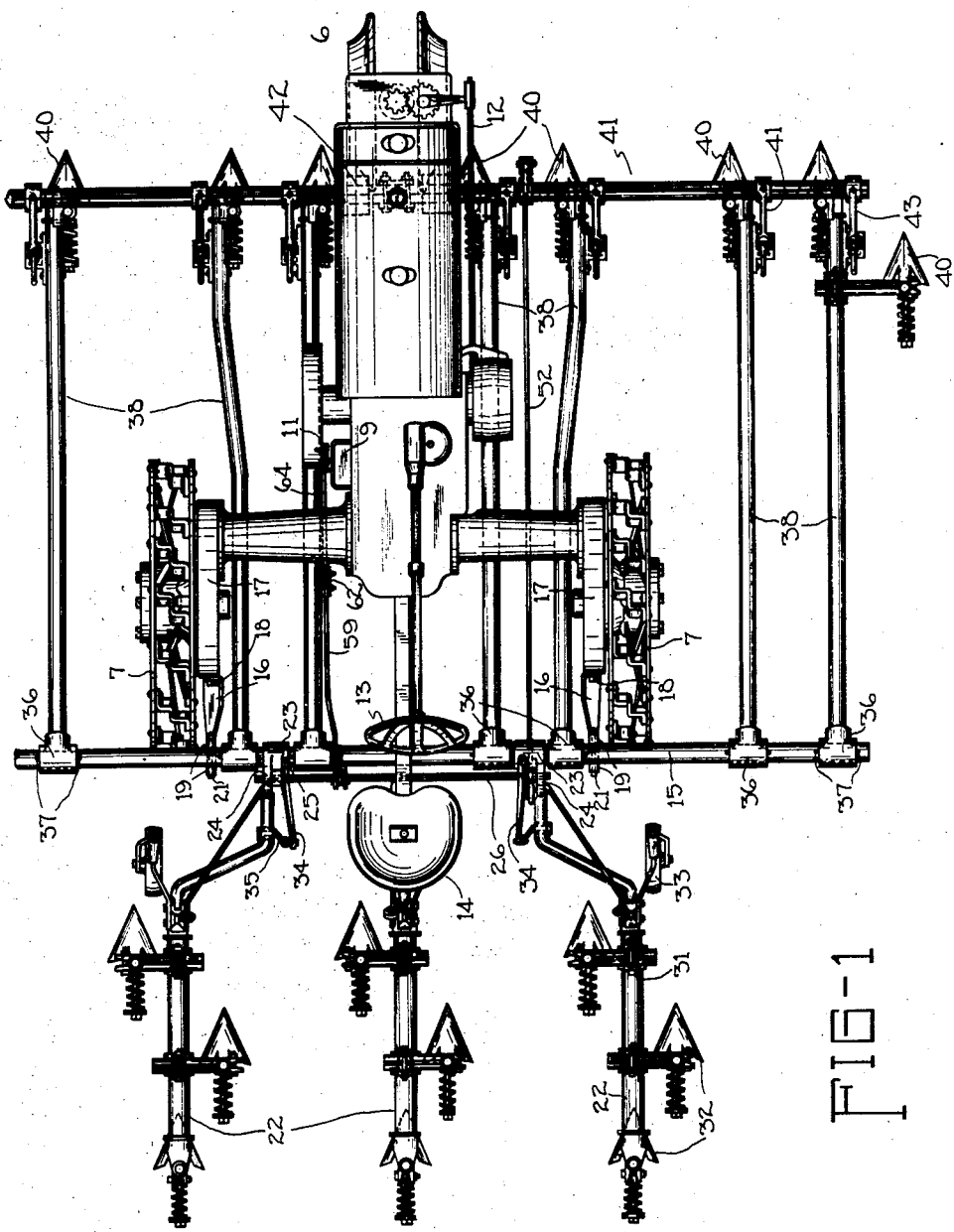

1,827,708

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

CULTIVATOR

Application filed October 1, 1930. Serial No. 485,588.

This invention relates generally to cultivating implements of the type illustrated in my copending application Serial No. 450,340, filed May 7, 1930, in which the broad features common to the two implements are disclosed and claimed. As shown such implement comprises an attachment adapted to be directly connected with a tractor so that the attachment and the tractor function together as a unitary, power operated cultivating implement, and in which the cultivating rigs of such attachment are separately pivotally connected with the attachment frame so as to be capable of rising and falling independently of each other in passing over uneven ground.

In prior machines of this type with which I am familiar the cultivator shovels for operating close to the plant rows have been positioned adjacent the front end of the tractor and carried by a transverse frame member positioned at the front end of the tractor and mounted either on its own carrying wheels or carried directly on the tractor itself, while the cultivator shovels operating in the middle rows have been positioned in rear of the tractor and carried on a separate transverse frame member from that which carries the front cultivator shovels.

My present invention has for its object to provide a construction comprising a single transversely extending frame member suitably connected with the rear portion of the tractor and pivotally supporting both the front and rear cultivator rigs, which makes for a cheaper and more unified construction.

Another object of my invention is to provide improved means for simultaneously adjusting the depth of penetration of the earth working shovels of all the front cultivator rigs.

A further object of my invention is to provide improved power lift mechanism for raising the front cultivator rigs, said mechanism including means for adjusting the depth of penetration of the shovels of the front cultivator rigs.

A still further object of my invention is to provide improved power lift mechanism for raising both the front and rear cultivator rigs comprising means for adjusting the depth of penetration of the shovels of the front cultivator rigs without affecting the depth of penetration of the shovels of the rear cultivator rigs.

A still further object of my invention is to provide master screw crank depth adjusting means for the front cultivator rigs mounted adjacent the operator's seat at the rear of the tractor and operative through the power lift linkage for the front cultivator rigs.

Other objects and advantageous features will be apparent from the following description of my invention taken in connection with the accompanying drawings, in which—

Fig. 1 is a top plan view illustrating a tractor equipped with my improvements;

Fig. 2 is a side elevation of the same; and

Fig. 3 is an enlarged fragmentary sectional view illustrating the master depth control crank screw adjusting device providing for adjusting the depth of penetration of the shovels of the front rigs simultaneously.

Referring to the drawings, the tractor comprises a suitable main frame structure 5 which is supported at its front end on two steering wheels 6 and at its rear end on two traction wheels 7. In the construction shown, the two steering wheels 6 are disposed close together, comparable to a three-wheel tractor, but it is to be understood that the invention is also applicable to a four-wheel tractor wherein the two steering wheels are spaced relatively far apart. The tractor motor is represented by the horizontal cylinder engine indicated at 8, from which power is transmitted through any conventional arrangement of clutch, selective speed transmission, differential mechanism and driving means to the rear traction wheels 7. In order to utilize the power of the engine for lifting the cultivator rigs to transport position the tractor is provided with a suitable power take-off device operatively connected with the engine and arranged to actuate a power lift clutch under the control of the operator.

Such power lift mechanism is indicated generally by the numeral 9, and it is deemed unnecessary to describe the same specifically because the details thereof constitute no part of the present invention. It will suffice to say here that the power shaft extends laterally from such mechanism and supports a crank 11 adjacent to the side of the tractor frame from which lifting movement is transmitted to the cultivator rigs through linkage which will be presently described.

The front tractor wheels 6 are steered by means of suitable steering mechanism represented in part by a drag link 12 which is operatively connected at its front end with said steering wheels and at its rear end with a steering control wheel 13 located adjacent to the operator's seat 14 at the rear end of the tractor.

Coming now to the cultivating implement detachably connected to the rear of the tractor, and supporting both the front and rear cultivator rigs, said implement comprises a transversely extending frame bar 15, preferably tubular in cross-section as shown, supported adjacent the rear end of the tractor by means of a pair of brackets 16, one of which is secured to each of the drive chain housings 17 that enclose the driving chains for the traction wheels 7 of the tractor, by means of bolts 18. Said brackets extend rearwardly from such housings so as to support said frame bar outside of the circumference of such traction wheels. The brackets 16 are each provided with two spaced lugs 19 forming a semi-circular recess between them for receiving the bar 16, said bar being held in non-rotative position in said recesses by means of bolts 21 passing through perforations in said lugs and through holes provided for that purpose in said frame bar. As shown, the opposite ends of the bar 15 extend a considerable distance outwardly beyond the traction wheels 7 at opposite sides of the tractor.

Supported on the frame bar 15 at spaced points across the intermediate portion thereof which lies between the brackets 16 are three rear cultivator rigs, indicated generally by the numeral 22. These three rigs are similar in construction with the exception that the beams of the two outer rigs are bent laterally so as to position them directly in rear of the two traction wheels of the tractor, as shown in Fig. 1. Each of the rear rigs is supported from the frame bar 15 by means of a sleeve 23 engaging over the bar and rigidly secured thereto in any suitable manner, as by means of screws or bolts extending transversely through the sleeve and bar.

An arm 24 projects upwardly and rearwardly from each sleeve 23 and has a bearing boss 25 formed at its outer end, in which several bearing bosses is rotatably mounted a rock shaft 26. Another arm 27 extends downwardly and rearwardly from each sleeve. Substantially parallel links 28, 29 are pivotally connected, respectively, with said arms 24, 27, extending downwardly and rearwardly therefrom as shown, and pivotally connected at their lower rear ends with a supporting member 30 in the form of a suitable casting on which the lower portion of the cultivator rig comprising the beam 31, the shovels 32, and the vertically adjustable gauge wheel 33 is supported.

These rear cultivator rigs and the means for supporting them on the frame bar 15 form no part of my present invention so they have only been briefly described herein. They are fully illustrated and described in the application of Theodore W. Johnson, Serial No. 485,844, filed Oct. 2, 1930, to which reference may be had if desired for a full understanding of the construction thereof.

The rock shaft 26 is square or polygonal in cross-section, and mounted thereon in the plane of each rig mounting sleeve 23 is a rig lifting arm 34. Each lifting arm is provided with a hub portion having a square or polygonal bore therein engaging over the rock shaft and slidable lengthwise thereof. Said hub portion extends through the bearing boss 25 and forms a bearing sleeve or bushing for rotatably mounting the rock shaft in the boss 25. The means for rigidly clamping the hub on the rock shaft is the same as that illustrated in the above mentioned application of Theodore W. Johnson, and, therefore, is not fully illustrated herein. The outer end of each lifting arm 34 is operatively connected with the lower link 29 of its associated rig mounting by means of a link or rod 35, the lower end of said link being bent laterally and passed through a flattened portion of said link 29, in which it is held against removal by a cotter pin or any other suitable means. This construction is also the same as that shown in said Johnson application.

Loosely mounted on the frame bar 15 at suitable points therealong so as to rotate thereon are a plurality of sleeves 36 which are held against longitudinal movement along said bar by cotter pins 37 extending transversely through said bar on opposite sides of said sleeves as shown in Fig. 1. Rigidly connected at its rear end to each of said sleeves and extending downwardly and forwardly therefrom is a relatively long beam 38 which is secured to said sleeve by means of a bolt or rivet 39, as shown in Fig. 2, or in any other suitable manner. Connected to each of said beams 38 adjacent the forward end thereof in any appropriate manner is one or more cultivator shovels 40. It will be seen from the foregoing that the front cultivator rigs comprising the long beams 38 and the shovels 40 are carried by the same frame bar as the rear rigs, and that the shovels of such front rigs are positioned near the forward end of the tractor adjacent the steering wheels thereof. By this construction the provision of a separate draft bar, either mounted on the tractor, or supported by its own carrying wheels and suitably connected with the tractor, for the attachment of the front cultivator rigs to the tractor, is avoided, with the result that a cheaper and more unified construction of implement is provided.

The depth at which the shovels of the front rigs are operated, and the raising and lowering thereof by the power lift mechanism, is controlled by means of a rock shaft 41 comprising two sections joined together at their adjacent ends by means of a suitable coupling member 42, said rock shaft sections being journaled in suitable bearings in the housing on the under side of the tractor adjacent the forward end thereof, as shown in dotted lines in Fig. 1. The purpose of providing this sectional rock shaft coupled together as described will appear hereinafter. Secured to said rock shaft so as to rotate therewith are a plurality of arms 43, one of such arms being provided for each of the beams 38. The rear end of each of the arms 43 is forked as shown in Fig. 1 to pivotally support a sleeve 44 in which is journaled the upper end of a depth adjusting crank screw 45. The lower end of the crank screw 45 threads into a nut 46 which is confined within a rectangular opening in a bracket 47 secured to one side of the beam 38 by means of bolts 48 as shown in Fig. 2, or in any other suitable manner.

If desired a relief spring 49 may be mounted on the crank screw 45, said spring acting against the lower end of the sleeve 44 and the upper surface of a collar 51 fixed on said crank screw adjacent the lower end thereof above the nut 46. This spring acts as a cushioning device to prevent breakage of the parts should the rigs be lowered by power to bring the shovels thereof into hard ground while the tractor is standing still.

The rocking of the rock shaft 41 is controlled through a link 52 pivotally connected at its forward end to an arm 53 fixed on said rock shaft to rotate therewith and extending downwardly therefrom as shown in Fig. 2. The rear end of the link 52 is pivotally connected to a nut 54 which is confined within an elongated opening in a member 55. The nut 54 is threaded on the threaded end of a master depth control crank-screw 56 which is journaled in the opposite ends of the member 55 as shown in Fig. 3, being held in position therein in any suitable manner.

The member 55 is fixedly mounted on the lifting rock shaft 26 which is operated by the power lift mechanism through linkage which will now be described.

Secured to the rock shaft 26 so as to rotate therewith and extending upwardly therefrom is an arm 57 to the upper end of which is pivotally connected by means of a pivot pin 58 the rear end of a link 59, said pivot pin passing laterally through said arm and link and being held in position by means of a cotter pin 61, as shown in Fig. 3. The link 59 is pivotally connected with a pendant link or bell crank 62 which is substantially T-shaped as shown in dotted lines in Fig. 2, the link 59 being connected with the base of the T. One end of the cross-bar of this T-shaped link is pivotally connected with a bracket 63 secured in any suitable manner to the rear axle housing of the tractor as shown in said figure. Pivotally connected with the opposite end of the cross-bar of the T-shaped link 62 is another link 64 which extends forwardly therefrom and has pivotal connection at its forward end with the crank 11 of the power lift mechanism previously described. This construction comprising the link 59, the substantially T-shaped link or bell crank 62, and the link 64 is provided between the arm 57 and the crank 11 instead of a single link so that this linkage mechanism will clear certain parts of the tractor adjacent thereto, which would not be possible with a single link construction extending directly from the arm 57 to the crank 11. As far as this particular construction is concerned, it is obvious that a single link extending from arm 57 to crank 11 may be employed if the construction of the tractor permits, and such arrangement is within the purview of the present invention.

The operation of my improved construction is as follows: With the parts in the positions they occupy as shown in Fig. 2, the cultivator shovels are in operating position, and when it is desired to raise the shovels to transport position the operator throws the power lift mechanism into operation which swings the outer end of the crank 11 downwardly and forwardly. This movement, through the links 64, 62, and 59, and the arm 57 will turn the rock shaft 26 in a clockwise direction. This turning of the rock shaft will swing the outer ends of the arms 34 upwardly and through their connections 35 with the rear rigs will raise such rigs. At the same time the lower end of the member 55 will swing in a clockwise direction, moving the link 52 rearwardly, thereby swinging the arm 53 in a clockwise direction to turn the front rock shaft 41 in the same direction, and the arms 43 which operatively connect each of the front cultivator rigs with said rock shaft will swing in a clockwise direction, thus raising the front cultivator rigs to transport position. It should be noted that by this construction all the links of the lifting mechanism operate under tension rather than under compression, which is a very desirable feature as there is no danger of buckling of the links as would be the case if they acted under compression, and, therefore, links of lighter construction may be employed, thus reducing the cost of manufacture.

When it is desired to regulate the depth of penetration of the front cultivator rigs, this may be either accomplished by separately adjusting them by means of their individual crank screws 45 or they may all be adjusted simultaneously by the master depth adjusting crank screw 56. The operation of this master depth adjusting crank screw for all the front cultivator rigs is as follows: For instance, with the parts in the positions they occupy as shown in Fig. 2 and in full lines in Fig. 3, by turning the crank screw to move the nut 54 upwardly in the member 55 the link 52 will be moved rearwardly, and through the arm 53 will turn the rock shaft 41 in a clockwise direction thus swinging upwardly the arms 43 connecting each of the front cultivator rigs with said rock shaft to raise the same to the desired extent. By a reverse rotation of the crank screw 56 the cultivator rigs may be lowered to the point desired, as will be readily understood. During this operation of the crank screw the member 55 is held in position against movement as it is non-rotatably connected with the rock shaft 26, and said rock shaft is held against turning by its connection with the power lift mechanism. As the front rock shaft, which is made in sections, has the sections coupled together so as to operate as a single shaft, but one depth adjusting crank screw is required to regulate the depth of penetration of all of the front cultivator rigs positioned on both sides of the tractor, as will be readily appreciated.

It is to be noted from Fig. 3 that when the rigs are in their raised position the crank screw or screw shaft 56 is in a position substantially at right angles to the connecting link 52. By virtue of this construction the position of the traveling nut 54, whether at one end or the other of its range of adjustment on screw 56, will have substantially no effect on the position of the forward rigs, that is, when the power lift is actuated to raise the rigs they will be brought to substantially the same position irrespective of the particular adjustment of the depth adjusting screw for the forward rigs. On the other hand, when the rigs are lowered the crank screw shaft 56 is in an inclined position with respect to the link 52 so that in this position, shown in full lines in Fig. 3, shifting of the nut 54 along screw shaft 56 adjusts the vertical position of all of the forward cultivator rigs.

In the illustrated construction I have shown a cultivator attachment provided with eight front cultivating rigs, four on each side of the median line of the tractor, for cultivating four plant rows and to operate close to the plants, but it is to be understood that the attachment may comprise a lesser number of rigs if desired for cultivating a lesser number of rows, and in any desired relation thereto. It is customary, however, to provide attachments of this type with a transverse frame bar of such length that four rows of plants may be cultivated, and if the operator wishes to cultivate a lesser number of rows he may readily remove the desired rigs by removing the cotter pins 35 on either side of the sleeves 34 and unthreading the depth adjusting screws 45 from the nuts 46 when the sleeves 36 with the beams 38 and the cultivator shovels carried thereby may be slid off of the transverse bar.

Another important feature of the present construction is that when it is desired to disconnect the entire cultivating implement from the tractor so as to use the tractor for other purposes, this may be easily and quickly accomplished by either removing the bolts 21 connecting the transverse bar 15 with the brackets, or the brackets themselves may be disconnected from the chain housings by removing the bolts 18. The power lift connection to the arm 46 may then be readily disassembled by withdrawing the cotter pin 49 and the pivot pin 47. Then the individual depth adjusting cranks 45 are unthreaded from the nuts 46, which separates the lifting connections of the beams 38 with the lifting rock shaft 41, whereupon the tractor with the lifting rock shaft may be driven forwardly free from the cultivator attachment. The lifting rock shaft 41 may then be removed from the tractor by disconnecting the coupling member 42 from the two sections of the rock shaft 41 and pulling such sections out of their bearing sockets in the frame of the tractor.

I claim:

1. In a tillage implement, the combination of a wheeled supporting frame, including a transverse supporting bar at the rear thereof, forwardly and rearwardly extending cultivator rigs connected respectively with said bar, and earth working tools carried by said rigs.

2. The combination with a tractor, of a tillage implement comprising an implement frame connected with the rear of the tractor, rearwardly extending cultivator rigs carried by said implement frame, and forwardly extending cultivator rigs carried by said implement frame.

3. The combination with a tractor, of a tillage implement comprising an implement frame connected with the rear of the tractor, rearwardly extending cultivator rigs carried by said implement frame, forwardly extending cultivator rigs carried by said implement frame, and means operated by the power of the tractor for simultaneously raising all of said rigs.

4. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, and means for simultaneously adjusting all of said front cultivator rigs to vary the depth of penetration of the earth working tools carried thereby.

5. In a tillage implement, the combination of a wheeled supporting frame, including a transverse supporting bar at the rear thereof, forwardly and rearwardly extending cultivator rigs connected respectively with said bar, earth working tools carried by all of said rigs, and means for simultaneously raising all of said rigs, said means including connections for simultaneously adjusting all of said front cultivator rigs to vary the depth of penetration of the earth working tools carried thereby.

6. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, and power operated means for simultaneously raising all of said rigs, said power operated means comprising means for simultaneously adjusting all of said front cultivator rigs to vary the depth of penetration of the earth working tools carried thereby.

7. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, power operated means for simultaneously raising all of said rigs, and hand operated means operative through said power operated means for simultaneously adjusting all of said front cultivator rigs to vary the depth of penetration of the earth working tools carried thereby.

8. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, and power operated mechanism for simultaneously raising all of said rigs, said power operated mechanism including means for adjusting the front rigs relative to said rear rigs.

9. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, a rock shaft supported by said implement frame, means for operating said rock shaft, means connecting said rearwardly extending cultivator rigs with said rock shaft, and means connecting said forwardly extending cultivator rigs with said rock shaft, said last-named means comprising devices for simultaneously adjusting all of said front cultivator rigs to vary the depth of penetration of the earth working tools carried thereby.

10. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, power operated means for raising all of said rigs, said means including devices for simultaneously adjusting all of said forwardly extending cultivator rigs to vary the depth of penetration of the earth working tools carried thereby, and means for vertically adjusting each of said forwardly extending cultivator rigs independently of the others.

11. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, power lift mechanism for simultaneously raising all of said cultivator rigs, master screw crank adjusting means carried by said implement frame and operative through said power lift mechanism for simultaneously adjusting all of said front cultivator rigs to vary the depth of penetration of the earth working tools carried thereby.

12. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, a rear rock shaft supported by said implement frame and operative to raise said rearwardly extending cultivator rigs, a front rock shaft supported by the tractor frame adjacent the forward end thereof and operative to raise said forwardly extending cultivator rigs, power operated means for rocking said first-named rock shaft, means connecting said first rock shaft with said second rock shaft for rocking the latter, said connecting means including means for vertically adjusting all of the forwardly extending cultivator rigs simultaneously.

13. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, and power operated means for raising all of said rigs, said means including devices for simultaneously adjusting all of said forwardly extending cultivator rigs to vary the depth of penetration of the earth working tools carried thereby and means for vertically adjusting each of said forwardly extending cultivator rigs independently of the others.

14. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, power operated mechanism for simultaneously raising all of said rigs in unison, and means associated with said power operated mechanism for simultaneously adjusting all of said forwardly extending cultivator rigs vertically to vary the depth of penetration of the earth working tools carried thereby, said last-named means being so arranged that said power operated mechanism raises said forwardly extending cultivator rigs to the same height regardless of the vertical adjustment thereof.

15. In an agricultural implement, the combination with a tractor including a motor, of an attachment comprising a frame secured to the rear portion of the tractor and extending laterally at opposite sides thereof, a plurality of rearwardly extending cultivator rigs connected with said frame, forwardly extending cultivator rigs connected with said frame, a rock shaft supported by said frame, power lift mechanism deriving power from the tractor motor, linkage acting under tension in the power lift operation connecting said power lift mechanism with said rear rock shaft, means connecting said rearwardly extending cultivator rigs with said rear rock shaft for raising said rigs by the operation of said rock shaft, and means connecting said rear rock shaft with said forwardly extending cultivator rigs for raising said rigs, said means comprising a rock shaft supported by the tractor adjacent the forward end thereof and a tension link connecting said last-named rock shaft with said rear rock shaft.

16. In an agricultural implement, the combination with a tractor including a motor, of an attachment comprising a frame secured to the rear portion of the tractor and extending laterally at opposite sides thereof, a plurality of rearwardly extending cultivator rigs connected with said frame, forwardly extending cultivator rigs connected with said frame, a rock shaft supported by said frame, power lift mechanism deriving power from the tractor motor, linkage acting under tension in the power lift operation connecting said power lift mechanism with said rear rock shaft, means connecting said rearwardly extending cultivator rigs with said rear rock shaft for raising said rigs by the operation of said rock shaft, means connecting said rear rock shaft with said forwardly extending cultivator rigs for raising said rigs, said means comprising a rock shaft supported by the tractor adjacent the forward end thereof and operatively connected with said rigs and a tension link connecting said last-named rock shaft with said rear rock shaft, and means associated with said tension link and operative to rock said rock shaft independently of said power lift mechanism for simultaneously adjusting all of said forwardly extending cultivator rigs vertically.

17. The combination with a tractor, of cultivating rigs positioned in rear thereof, cultivator rigs having earth working tools positioned adjacent the forward end of the tractor, a transversely extending unitary supporting means for all of said rigs connected with the tractor at the rear thereof, and power lift mechanism deriving power from the tractor motor for simultaneously raising all of said rigs, said power lift mechanism including linkage acting under tension during the power lift operation.

18. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, a rear rock shaft supported by said implement frame and operative to raise said rearwardly extending cultivator rigs, a front rock shaft supported by the tractor frame adjacent the forward end thereof and operative to raise said forwardly extending cultivator rigs, adjustable means connecting said rock shafts and operable to adjust said forwardly extending rigs relative to the rearwardly extending rigs, said means including a link connected to one of the rock shafts and a shiftable connection between said link and the other rock shaft, said shiftable connection arranged to be movable in a direction substantially at right angles to the link when said rigs are in their raised position, and means operated from the tractor for rocking said rear rock shaft.

19. The combination with a tractor, of a tillage implement comprising an implement frame connected with the rear of the tractor, rearwardly extending cultivator rigs carried by said implement frame, forwardly extending cultivator rigs carried by said implement frame, earth working tools carried by all of said rigs, a rear rock shaft supported by said implement frame and operative to raise said rearwardly extending cultivator rigs, a front rock shaft supported by the tractor frame adjacent the forward end thereof and operative to raise said forwardly extending cultivator rigs, adjustable means connecting said rock shafts and operable to adjust said forwardly extending rigs relative to the rearwardly extending rigs, said means including a link connected to one of the rock shafts to rock the same, an area on the other rock shaft and provided with a screw shaft journaled thereon, and a traveling nut threaded on said screw shaft and pivotally connected to said link, said screw shaft being arranged to extend at right angles to said link when the rigs are raised and inclined with respect to said link when the rigs are lowered whereby in the lowered position the screw shaft may be actuated to vertically adjust the operating position of the forward rigs, and means operated from the tractor for rocking said rear rock shaft.

20. The combination with a tractor, of a tillage implement comprising an implement frame, means detachably securing the frame to the rear of the tractor, rearwardly extending cultivator rigs carried by said implement frame, forwardly extending cultivator rigs carried by said implement frame, earth working tools carried by all of said rigs, and power operated means for raising all of said rigs, said means including a front rock shaft detachably journaled to the forward portion of the tractor.

21. The combination with a tractor having rear traction wheels and front steering wheels, of a tillage implement comprising a transverse supporting bar positioned at the rear of the tractor back of the axles of the traction wheels, cultivator beams mounted on said bar and extending forwardly substantially to the transverse plane of the front steering wheels, and earth working tools on the forward ends of said beams.

22. The combination with a tractor having rear traction wheels and front steering wheels, of a tillage implement comprising a transverse supporting bar positioned toward the rear of the tractor, cultivator beams mounted on said bar and extending forwardly substantially to the transverse plane of the front steering wheels, earth working tools on the forward ends of said beams, and means carried on the tractor for controlling the operating position of said tools.

23. The combination with a tractor having rear traction wheels and front steering wheels, of a tillage implement comprising a transverse supporting bar positioned at the rear of the tractor back of the axles of the traction wheels, cultivator beams mounted on said bar and extending forwardly substantially to the transverse plane of the front wheels, earth working tools on the forward ends of said beams, and supporting means for said devices including a transverse bar secured to the tractor near the front ends of said beams and connected thereto.

In witness whereof, I hereunto subscribe my name this 25th day of September, 1930.

THEOPHILUS BROWN.